United States Patent
Oh et al.

(10) Patent No.: US 11,332,143 B2
(45) Date of Patent: May 17, 2022

(54) METHOD FOR CONTROLLING WHEEL SLIP OF VEHICLE

(71) Applicants: Hyundai Motor Company, Seoul (KR); Kia Motors Corporation, Seoul (KR)

(72) Inventors: Ji Won Oh, Gyeonggi-do (KR); Jeong Soo Eo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 215 days.

(21) Appl. No.: 16/700,446

(22) Filed: Dec. 2, 2019

(65) Prior Publication Data
US 2021/0039651 A1   Feb. 11, 2021

(51) Int. Cl.
*B60W 30/18* (2012.01)
*B60W 40/105* (2012.01)
*B60W 10/08* (2006.01)
*B60W 10/06* (2006.01)

(52) U.S. Cl.
CPC ...... *B60W 30/18172* (2013.01); *B60W 10/06* (2013.01); *B60W 10/08* (2013.01); *B60W 40/105* (2013.01); *B60W 2510/0638* (2013.01); *B60W 2520/30* (2013.01); *B60W 2720/26* (2013.01); *B60W 2720/30* (2013.01)

(58) Field of Classification Search
CPC ......... B60W 30/18172; B60W 40/105; B60W 10/08; B60W 10/06; B60W 2510/0638; B60W 2720/26; B60W 2720/30; B60W 10/04; B60W 2710/0666; B60W 2510/105; B60W 30/02; B60W 40/00; B60W 2510/1015; B60W 2510/104; B60W 2710/081
See application file for complete search history.

(56) References Cited

U.S. PATENT DOCUMENTS

2015/0274159 A1* 10/2015 Lu .................. B60W 30/02
                                            701/82
2017/0057515 A1* 3/2017 Kelly ................ B60W 10/22

* cited by examiner

*Primary Examiner* — Marthe Y Marc-Coleman
(74) *Attorney, Agent, or Firm* — Mintz Levin Cohn Ferris Glovsky and Popeo, P.C.; Peter F. Corless

(57) ABSTRACT

A method for controlling a wheel slip of a vehicle is provided. The method includes estimating equivalent inertia information of a driving system based on operation information of the driving system during operation of a vehicle and subsequently, calculating the amount of calibration for calibrating a torque command of a driving device for driving the vehicle from the estimated equivalent inertia information of the driving system. The torque command of the driving device is calibrated using the calculated amount of calibration and subsequently the torque applied to a driving wheel is adjusted according to the calibrated torque command.

12 Claims, 4 Drawing Sheets

METHOD FOR CONTROLLING WHEEL SLIP OF VEHICLE

CROSS-REFERENCE TO RELATED APPLICATION

This application claims under 35 U.S.C. § 119(a) the benefit of priority to Korean Patent Application No. 10-2019-0096432 filed on Aug. 8, 2019, the entire contents of which are incorporated herein by reference.

BACKGROUND

(a) Technical Field

The present disclosure relates to a method for controlling a wheel slip of a vehicle, and more particularly, to a method for controlling a wheel slip of a vehicle wheel without using a reference speed in a vehicle to use the maximum frictional force in a tire friction source regardless of a road condition and the amount of handling, thereby securing stability and performance of a vehicle.

(b) Background Art

In general, an Anti-lock Brake System (ABS) that prevents brake lock due to wheel slip on a slippery road surface at braking of a vehicle, and a Traction Control System (TCS) for adjusting a driving force or a braking force to prevent a wheel slip at sudden start or sudden acceleration of the vehicle, an Electronic Stability Program (ESP) for stably adjusting the posture of the vehicle, etc. are known as an electronic control system for improving safety during traveling of a vehicle.

Among them, the TCS is an active safety device that prevents excessive slip at sudden start or acceleration of the vehicle on a low friction road or an asymmetric road, thereby preventing a vehicle spin, and improving the start and acceleration performance, and the steering stability of the vehicle. When excessive driving force is generated at the start or acceleration of the vehicle on the slippery road causing the phenomenon such as wheel slip to occur, the TCS adjusts the speed of a driving wheel by adjusting the driving force (e.g., driving torque) or the braking force (e.g., braking torque) of the vehicle to allow the acceleration of the vehicle to be maximized.

Particularly, the driving force of the vehicle may refer to torque output from the vehicle driving source, and the vehicle driving source may be a motor (e.g., pure electric vehicle, fuel cell vehicle), an engine (e.g., internal combustion engine vehicle), or a motor and an engine (e.g., hybrid vehicle). For example, in a motor driving vehicle such as a pure electric vehicle, a fuel cell vehicle, or a hybrid vehicle, a target speed of a driving wheel is determined to achieve an optimal driving force according to the amount of slip generated between the driving wheel and the road surface and the friction coefficient of the road surface, and the motor torque is adjusted to follow the above. In addition, it may be possible to reduce the motor torque to prevent instability of the vehicle when the vehicle turns at a corner road, thereby allowing the vehicle to turn safely.

At operation of the TCS, torque is adjusted to reduce slip by calculating the slip of the vehicle wheel based on the actual vehicle speed while the vehicle is being driven, and it is necessary to determine the actual vehicle speed and the vehicle wheel speed, which are real-time information, to calculate the slip of the vehicle wheel. For example, the slip rate ($\lambda$) of the vehicle wheel may be calculated as follows.

$$\lambda(\%) = (Vveh - Vwhl)/Vveh \times 100$$

wherein, the 'Vveh' refers to a vehicle speed, that is, the vehicle body speed, which is a reference speed necessary for calculating the slip rate, and this reference speed has the meaning of the vehicle speed in a state where there is no slip, and is essential information for the TCS operation. The 'Vwhl' refers to a vehicle wheel speed (wheel speed), which is measured by a wheel speed sensor.

As described above, since the reference speed is essential for the TCS operation, accurate estimation of the reference speed is required to implement accurate and proper control performance. In general, the reference speed may be obtained using the vehicle wheel speed of the non-driven wheel, using a G sensor configured to detect the longitudinal acceleration, or the vehicle speed obtained through GPS reception information may be used as the reference speed, and furthermore, a yaw rate sensor is also used to calibrate the reference speed.

Meanwhile, despite the introduction of various electronic control systems in the vehicle, the behavior of the vehicle is finally limited due to the limitation of the road frictional force because the behavior of the vehicle is obtained through the frictional force with the road surface through the tire, and accordingly, how to effectively use the frictional force becomes an important factor in determining the behavior of the vehicle.

The maximum road frictional force is compositely influenced by the characteristics of the road surface, a longitudinal/lateral tire slip, a tire vertical load, etc., and typically, as the size of the slip increases, the available frictional force reduces. Accordingly, it is important to maintain effective longitudinal/lateral frictional force by limiting the tire slip of the vehicle wheel, and this role is played by the electronic control system such as ABS or TCS in the vehicle.

However, in the known ABS or TCS control method, it is difficult to maintain the ideal control performance due to a control cycle delay or a wheel speed signal processing for preventing malfunction, and thus, the slip condition that produces the maximum road frictional force is not maintained and a significant slip occurs. As a result, due to the characteristics of the tire that the tire frictional force becomes less than the maximum road surface frictional force when the tire slip rate of the vehicle wheel is high, a low frictional force is used rather than the maximum road surface frictional force, thereby not effectively securing stability and performance of the vehicle.

The above information disclosed in this section is only for enhancement of understanding of the background of the disclosure and accordingly it may contain information that does not form the prior art that is already known in this country to a person of ordinary skill in the art.

SUMMARY

Accordingly, the present disclosure provides a method for controlling a wheel slip, which may control a wheel slip of a vehicle wheel without using a reference speed in a vehicle, and use the maximum frictional force in a tire friction source regardless of a road surface condition and the amount of handling, thereby securing stability and performance of the vehicle.

For achieving the object, according to an exemplary embodiment of the present disclosure, a method for controlling a wheel slip of a vehicle may include: estimating, by a controller, equivalent inertia information of a driving system based on operation information of the driving system during operation of a vehicle; subsequently, calculating the amount of calibration for calibrating a torque command of a driving device for driving the vehicle from the equivalent inertia information of the driving system estimated by the controller; subsequently, calibrating, by the controller, the torque command of the driving device using the calculated amount of calibration; and subsequently, performing, by the controller, an adjustment of the torque applied to a driving wheel based on the calibrated torque command.

Accordingly, with the method for controlling the wheel slip of the vehicle according to the present disclosure, it may be possible to perform the wheel slip control of the vehicle without using the reference speed in the vehicle, and to use the maximum frictional force in the tire friction source regardless of the road surface condition and the amount of handling, thereby securing stability and performance.

BRIEF DESCRIPTION OF THE DRAWINGS

The above and other features of the present disclosure will now be described in detail with reference to exemplary embodiments thereof illustrated in the accompanying drawings which are given herein below by way of illustration only, and thus are not limitative of the present disclosure, and wherein.

Figure 1:
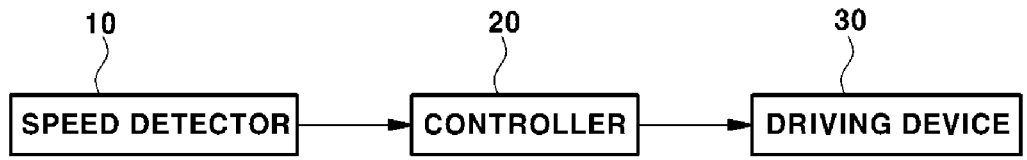
FIG. 1 is a block diagram schematically showing a configuration of a system for performing a wheel slip control according to an exemplary embodiment of the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in section by the particular intended application and use environment. In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings so that those skilled in the art may easily carry out the present disclosure. However, the present disclosure is not limited to the embodiments described herein and may also be embodied in other forms.

The present disclosure relates to a method for controlling a wheel slip of a vehicle, and an object thereof is to provide a method capable of effectively adjusting a wheel slip of a vehicle without using a vehicle wheel speed of a non-driven wheel or using a reference speed obtained by a complicated calculation with other methods. In particular, the present disclosure relates to a method for controlling a wheel slip based on the equivalent inertia of a vehicle, and for controlling the wheel slip of the vehicle by calibrating a torque command for a driving device for driving the vehicle using the equivalent inertia information estimated by a controller.

The present disclosure is a control method capable of preemptively limiting the wheel slip in the transient section before the conventional TCS control or wheel slip control. In addition, the present disclosure relates to a method for controlling a wheel slip useful for a motor-driven vehicle such as an eco-friendly vehicle, that is, a battery electric vehicle (BEV), a hybrid vehicle (Hybrid Electric Vehicle, HEV), or a fuel cell vehicle (Fuel Cell Electric Vehicle, FCEV), using a motor as a driving device for driving a vehicle.

The present disclosure is also applicable to a general engine (e.g., internal combustion engine) vehicle as well as a vehicle equipped with a motor as a driving device for driving a vehicle, but may be used and applied as a more effective wheel slip control method in a motor-driven vehicle using a motor. Since the method for controlling the wheel slip according to the present disclosure performs a driving force control for the driving device in real time, immediately, and instantaneously using the equivalent inertia for adjusting or suppressing the wheel slip as described later, it is useful in the motor-driven vehicle equipped with the motor having a fast control responsiveness compared to the engine as the vehicle driving device.

The known TCS calculates the slip amount (or slip rate) of the driving wheel corresponding to the difference between the two speeds using the reference speed and the vehicle wheel speed (e.g., driving wheel speed), and adjusts the torque (may be driving torque or braking torque) to reduce the slip amount. On the other hand, the present disclosure estimates the equivalent inertia information of the driving system in a controller based on operation information of the driving system without using the reference speed, and adjusts the torque to increase the equivalent inertia using the estimated value.

Particularly, the operation information of the driving system may include a driving force command (e.g., torque command) of a previous control period for the driving device and speed information of the driving system. As described above, the present disclosure controls the wheel slip by adjusting the driving force based on the equivalent inertia information without using the vehicle speed, which is the reference speed, and according to this method, it may be possible to secure rapid responsiveness in the transient section.

Hereinafter, exemplary embodiments of the present disclosure will be described in more detail with reference to the drawings. In the following description of the exemplary embodiment, the driving force refers to the output of the driving device, that is, the torque (driving torque) at the time of driving the driving device, and since the present disclosure is also applicable to the regeneration of the driving device, the driving force may be replaced with the regenerative force or the braking force, and at this time, the torque refers to a braking torque.

Figure 2:
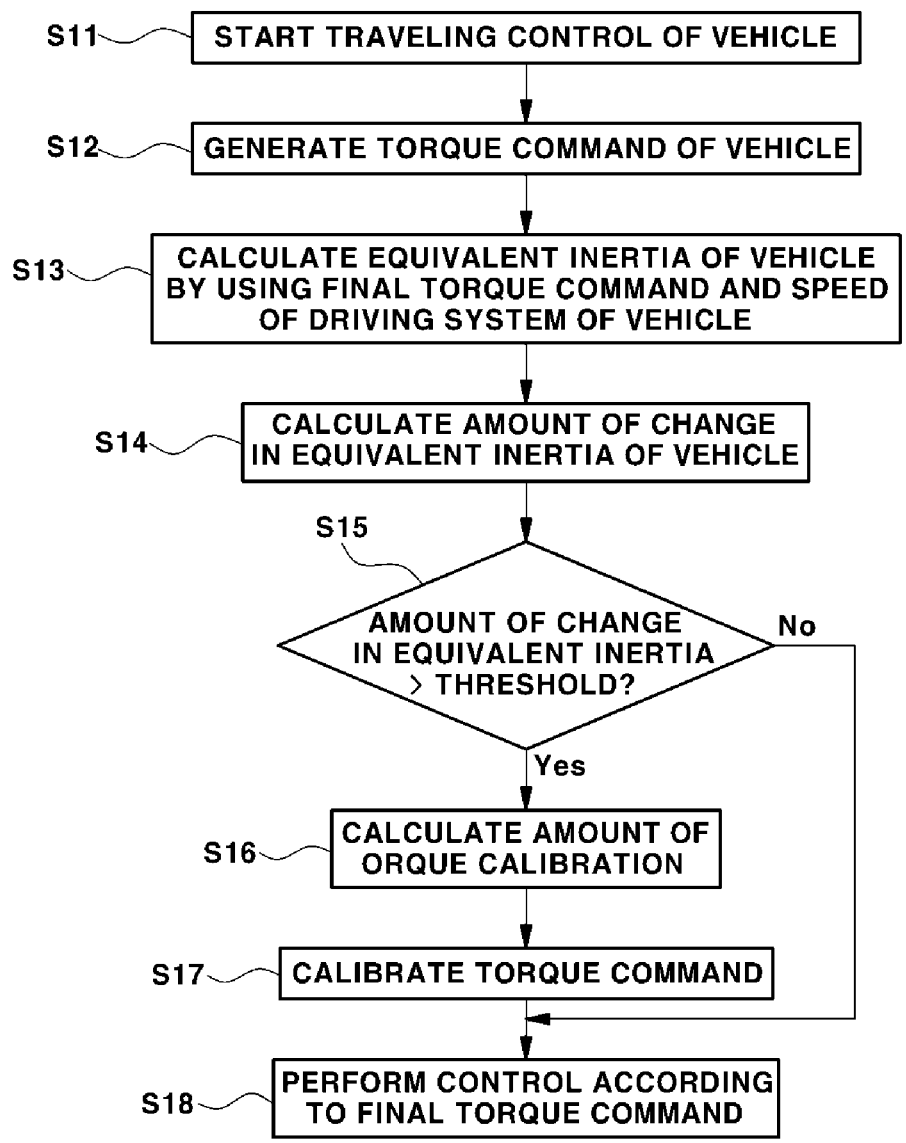
FIG. 2 is a flowchart showing a wheel slip control process of a vehicle according to an exemplary embodiment of the present disclosure.

FIG. 1 is a block diagram schematically showing a configuration of a system for performing a wheel slip control according to the present disclosure, and FIG. 2 is a flowchart showing a wheel slip control process of a vehicle according to the present disclosure. As shown in FIG. 1, a system for performing a wheel slip control according to the present disclosure may include a speed detector 10 configured to detect a speed of the driving system, a controller 20 configured to receive speed information of the driving system detected by the speed detector 10 to generate a calibrated torque command for a wheel slip control, and a driving device 30 configured to operate according to the calibrated torque command generated and output by the controller 20.

In the present disclosure, the controller 20 may be configured to estimate and calculate equivalent inertia information of the driving system using the speed information of the driving system detected by the speed detector 10, and the controller 20 may be configured to calibrate the torque command (e.g., driving force command) based on the estimated equivalent inertia information of the driving system. Particularly, the speed of the driving system may be a rotational speed of a driving element existing in a route where a driving force is transmitted from the driving device 30 for driving the vehicle to a driving wheel (not shown), or may be a rotational speed related to other driving wheel speeds, which is the real-time rotational speed information of the driving system detected by the speed detector 10 as a measured value.

For example, the speed of the driving system for estimating the equivalent inertia information may be the speed of the driving wheel connected with the driving device 30, or may be the rotational speed of the driving device 30, or the rotational speed of a transmission input shaft or the rotational speed of a transmission output shaft. In the present disclosure, when the speed of the driving system is the speed of the driving wheel, the speed detector 10 may be a wheel speed sensor installed in the driving wheel.

Alternatively, in the present disclosure, when the speed of the driving system is the rotational speed of the driving device 30, the speed detector 10 may be a known engine revolutions per minute (RPM) sensor configured to detect an engine speed or a known resolver configured to detect a motor speed. Alternatively, the speed of the driving system may also be a rotational speed of an integrated starter and generator (ISG), which is a starter generator connected to the engine, and in the present disclosure, may be used as a speed of the driving system for estimating equivalent inertia information when the rotational speed is related to the driving wheel speed.

In addition, a torque control for limiting equivalent inertia-based wheel slip may be performed by the in-vehicle controller 20, and the in-vehicle controller 20 may be a controller configured to execute a known TCS control or wheel slip control, and this controller may be a single controller or a plurality of controllers configured to execute a cooperative control. In addition, in the present disclosure, the controller 20 may be a controller that includes both a vehicle controller that is an upper controller, and a motor controller that is a lower controller, which perform a cooperative control in the vehicle.

In the present disclosure, when a vehicle traveling control is started (operation S11), the controller 20 may be configured to generate a primary torque command (e.g., driving force command) required for operation of the vehicle according to a driver's operating input (e.g., to drive the vehicle based on accelerator manipulation) or cruise mode input. (operation S12). In addition, the controller 20 may be configured to estimate the equivalent inertia information of the driving system from the operation information of the driving system in real time, and the equivalent inertia information of the driving system may include the equivalent inertia and the amount of change in the equivalent inertia obtained from the equivalent inertia.

In other words, the controller 20 may be configured to calculate the equivalent inertia of the vehicle from the operation information of the driving system (operation S12), and then calculate the amount of change in the equivalent inertia from the calculated equivalent inertia (operation S13). Particularly, the amount of change in the equivalent inertia may be a difference between the equivalent inertia of the driving system obtained in real time and the basic equivalent inertia that is a predetermined value.

Subsequently, the controller 20 may be configured to compare the calculated amount of change the equivalent inertia with a predetermined threshold (operation S15), and when the amount of change in the equivalent inertia is greater than the threshold, the controller 20 may be configured to calculate a torque calibration amount for a wheel slip control based on the estimated equivalent inertia information (operation S16). Subsequently, the controller 20 may be configured to calibrate the primary torque command using the calculated torque calibration amount (operation S17), and operate the driving device 30 with the calibrated torque command so that the calibrated torque may be applied to the driving wheel. (operation S18).

The driving device 30 may be an engine or a motor as a drive source for driving a vehicle, and in the present disclosure, the torque command may be an engine torque command or a motor torque command. In the present disclosure, the operation information of the driving system used to estimate the equivalent inertia information may include the final torque command of the driving device 30 and the real-time speed information of the driving system.

In particular, the final torque command is the torque command of the previous control period, and when the torque calibration has been generated based on the equivalent inertia information in the previous control period, the calibrated torque command becomes the final torque command. The real-time speed information of the driving system is the speed detected by the speed detector 10. In addition, in calculating the torque calibration amount for calibration based on the equivalent inertia information estimated by the controller 20, the torque calibration amount may be calculated using a value of the equivalent inertia information, for example, the amount of change in the equivalent inertia, estimated by the controller 20. Specifically, the torque calibration amount may be calculated using the amount of change in the equivalent inertia and the calibration gain of the equivalent inertia estimated by the controller 20.

In other words, the torque calibration amount may be determined by applying the calibration gain to the amount of change in the equivalent inertia, which is a value of the estimated equivalent inertia information, and for example, may be obtained by multiplying the amount of change in the equivalent inertia by the calibration gain, and at this time, the greater the amount of change in the equivalent inertia is, the greater the torque calibration amount is. In addition, in the present disclosure, a primary torque command may be calibrated using the torque calibration amount. When the torque calibration amount has been defined as a positive value and the torque calibration amount is obtained, the calibrated torque command may be obtained and generated by a value obtained by subtracting the torque calibration value from the torque command (e.g., torque command before calibration, that is, the primary torque command).

In the present disclosure, the calibrating the torque refers to reducing the torque generated and applied by the driving device 30 to the driving wheel compared to that before the calibration. As a result, as described above, when the calibrated torque command is generated, a control may be performed to adjust the torque of the driving device 30 by targeting the above.

In the present disclosure, the controller 20 may be configured to estimate the equivalent inertia information of the driving system using the torque command of the previous control period and the speed of the driving system as an input. At this time, the controller 20 may be configured to calculate the equivalent inertia of the driving system, and calculate the amount of change in the equivalent inertia from the equivalent inertia to calculate the torque calibration amount. The equivalent inertia of the equivalent inertia information described above may be an equivalent inertia itself, but may be replaced with an inverse equivalent inertia that is the inverse thereof, or also applied by being equally replaced with an error value of the equivalent inertia value, or a squared value of the equivalent inertia value.

The controller 20 uses the relationship of the following Equation 1, where the '$T_q$' refers to a torque, the 'I' refers to an equivalent inertia, and the 'a' refers to an angular acceleration, which is a speed (angular velocity) derivative.

$$T_q = I \times \alpha \qquad \text{Equation 1}$$

In the present disclosure, the controller 20 may be configured to calculate the required equivalent inertia from the angular acceleration obtained from the speed of the driving system and the torque transferred through the driving system, where the torque may be a torque command.

More specifically, the torque ($T_q$) in the Equation 1 may be the torque command of the previous control period that is the final torque command, that is, the torque command of the previous control period for the driving device 30, which may be the calibrated torque command of the previous control period when the torque calibration has been generated based on the previous equivalent inertia information in the previous control period. Particularly, the torque command before calibration is a normal torque command generated by the controller 20 for operating the vehicle according to the driver's operating input or cruise mode input.

For example, the driving torque (driving force) command may be generated by the controller 20 based on the need of the driving force in a control of the driver's operating input or cruise mode, etc., and usually, the control may be performed to follow the driving torque command as it is, but when a wheel slip (tire slip) is generated, the driving torque command generated as described above should be calibrated to limit excessive slip.

The controller 20 may be configured to perform a calibration to reduce the torque command before calibration, and when the torque calibration amount is defined as a positive (+) value, the torque command after calibration becomes a value obtained by subtracting the torque calibration amount from the torque command before calibration. As a result, when the torque command after calibration is generated as described above, the vehicle driving force control for operating the driving device 30 may be performed by targeting the above.

Figure 3:
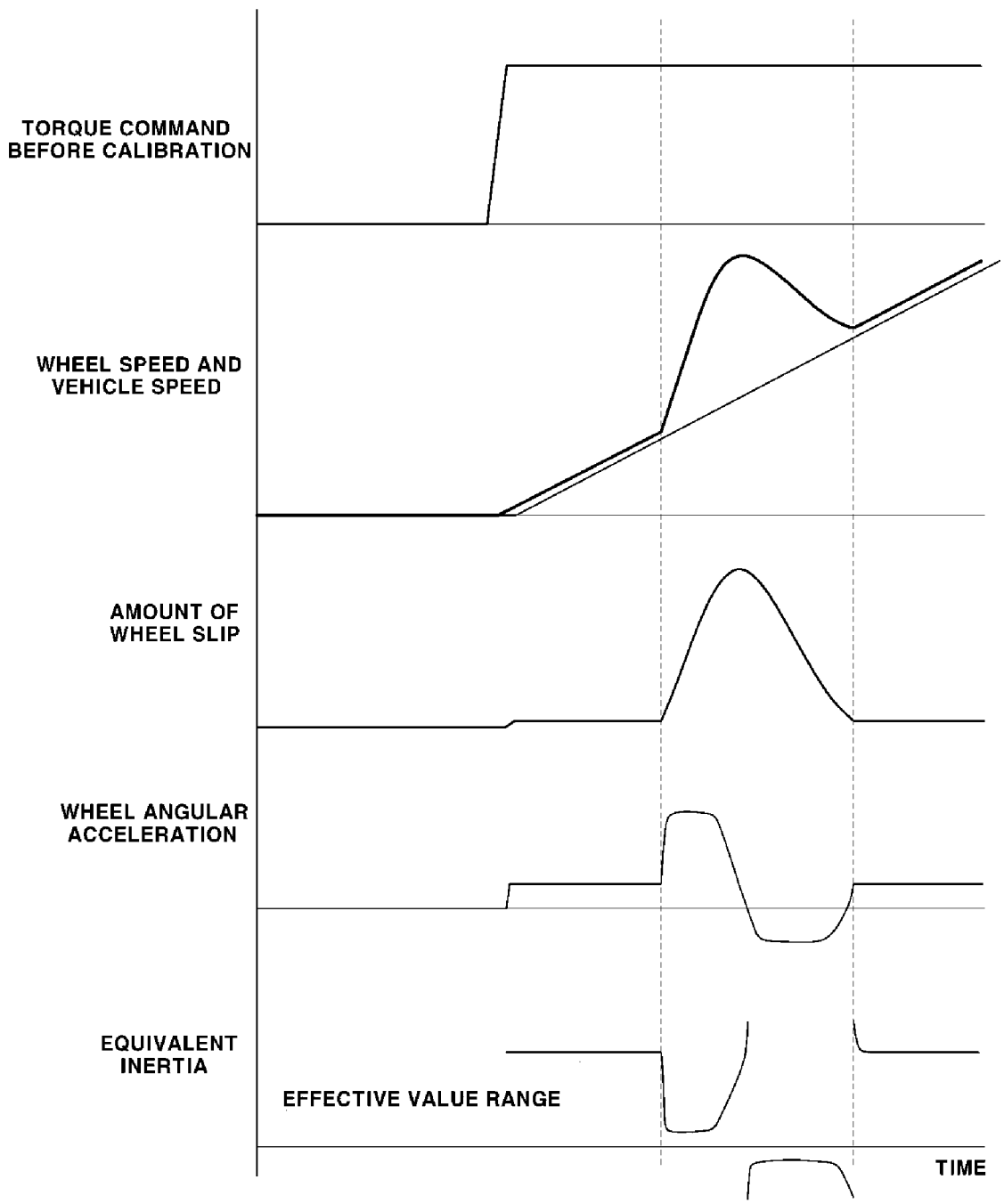
FIG. 3 is a diagram for explaining equivalent inertia in an exemplary embodiment of the present disclosure.

FIG. 3 is a diagram for explaining an equivalent inertia in the present disclosure. In the present disclosure, the equivalent inertia specifically refers to the equivalent rotation inertia of the vehicle, which is a value associated with the vehicle weight, and refers to the inertia value to maintain the current rotational state, and since the actual vehicle is a linear motion object rather than a rotating object, it is common to discuss inertia, that is, mass.

However, from the perspective of the driving force source, the mass of the vehicle itself acts as a load in accelerating and decelerating the angular velocity, and the mass value corresponding to the load converted into the rotating system is the equivalent rotational inertia of the vehicle. As an example of the derivation of the equivalent inertia (e.g., equivalent rotational inertia) in the relationship between the driving force (driving torque) and the wheel acceleration, F will be the driving force when '$F = m \times a$' is applied to the acceleration state of the vehicle, and where the m refers to the mass or inertia of the vehicle, and the a refers to the longitudinal acceleration of the vehicle.

When converted into the rotating system, the equation becomes '$T_q = I \times \alpha$', where the $T_q$ refers to a driving torque, the I refers to an equivalent inertia, and the a refers to an angular acceleration of the vehicle rotating system. The equivalent inertia may be calculated using '$I=T_q/\alpha$,' and for example, the equivalent inertia may be calculated by 'driving torque/angular acceleration,' where wheel angular acceleration, motor angular acceleration, engine angular acceleration, etc. may be used as the angular acceleration.

When the wheel slip is generated, the calculated equivalent inertia value changes abruptly, and when the equivalent inertia is calculated through the equation '$I=T_q/\alpha$,' the equivalent inertia may be obtained by the same equation even in the situation where the wheel slip is not generated. When the wheel slip has been generated, the wheel angular acceleration is greatly increased substantially even when the wheel slip speed has merely been increased slightly.

Accordingly, when dividing the same torque ($T_q$) value by the greatly increased wheel angular acceleration ($\alpha$), an instantaneously reduced equivalent inertia (I) may be calculated, and as a result, it may be seen that the change in the equivalent inertia (I) is faster than the wheel slip speed (see the example in FIG. 3). In addition, in the present disclosure, when calculating the equivalent inertia information using the operation information of the driving system, that is, the torque command of the previous control period that is the final torque command and the speed information of the driving system, according to the Equation 1, the controller 20 may be configured to determine whether calibration is required using the calculated equivalent inertia information.

The overall equivalent inertia of the vehicle with no slip generated may be obtained through the final torque command and the wheel acceleration as in the Equation 1, and the equivalent inertia value of the vehicle thus obtained is greater than the equivalent inertia value when the wheel slip is generated. In particular, when the wheel slip is generated, the driving torque accelerates only the driving wheel rather than accelerating the vehicle, and as a result, considering such a relationship, the wheel slip may be determined to occur when the calculated equivalent inertia of the vehicle is reduced to a certain value or less.

Accordingly, in the present disclosure, as described above, the controller 20 may be configured to compare the calculated amount of change (e.g., the amount of reduction) in the equivalent inertia with a predetermined threshold and be set to determine that the torque should be calibrated when the calculated amount of change in the equivalent inertia is greater than a threshold.

At this time, the existing torque command may be calibrated using the calculated equivalent inertia value or a function value using the same to calibrate the torque. Particularly, calibrating the torque refers to calibrating the torque to reduce the wheel slip, which should be performed in the direction of reducing the driving force (e.g., driving torque) when the vehicle is being driven and in the direction of reducing the braking force (braking torque) when the vehicle is being decelerated. In addition, the amount of change in the equivalent inertia compared with the threshold may be a difference between the real-time equivalent inertia of the driving system and a basic equivalent inertia of a predetermined value.

The driving force or the driving torque has the linear relationship with acceleration, and accordingly, a value that corresponds to the equivalent inertia of the vehicle may be calculated using the torque command of the previous control period that is the final torque command of the vehicle, and the amount of change per unit time of the driving system angular velocity (angular acceleration). Using this value, the time at which the value is reduced and the amount of reduction may be observed to determine the wheel slip start time and the slip increase speed, and in the present disclosure, the controller 20 may be configured to determine whether the calibration is required by comparing the amount of change in the equivalent inertia of the vehicle with the threshold.

Figure 4:
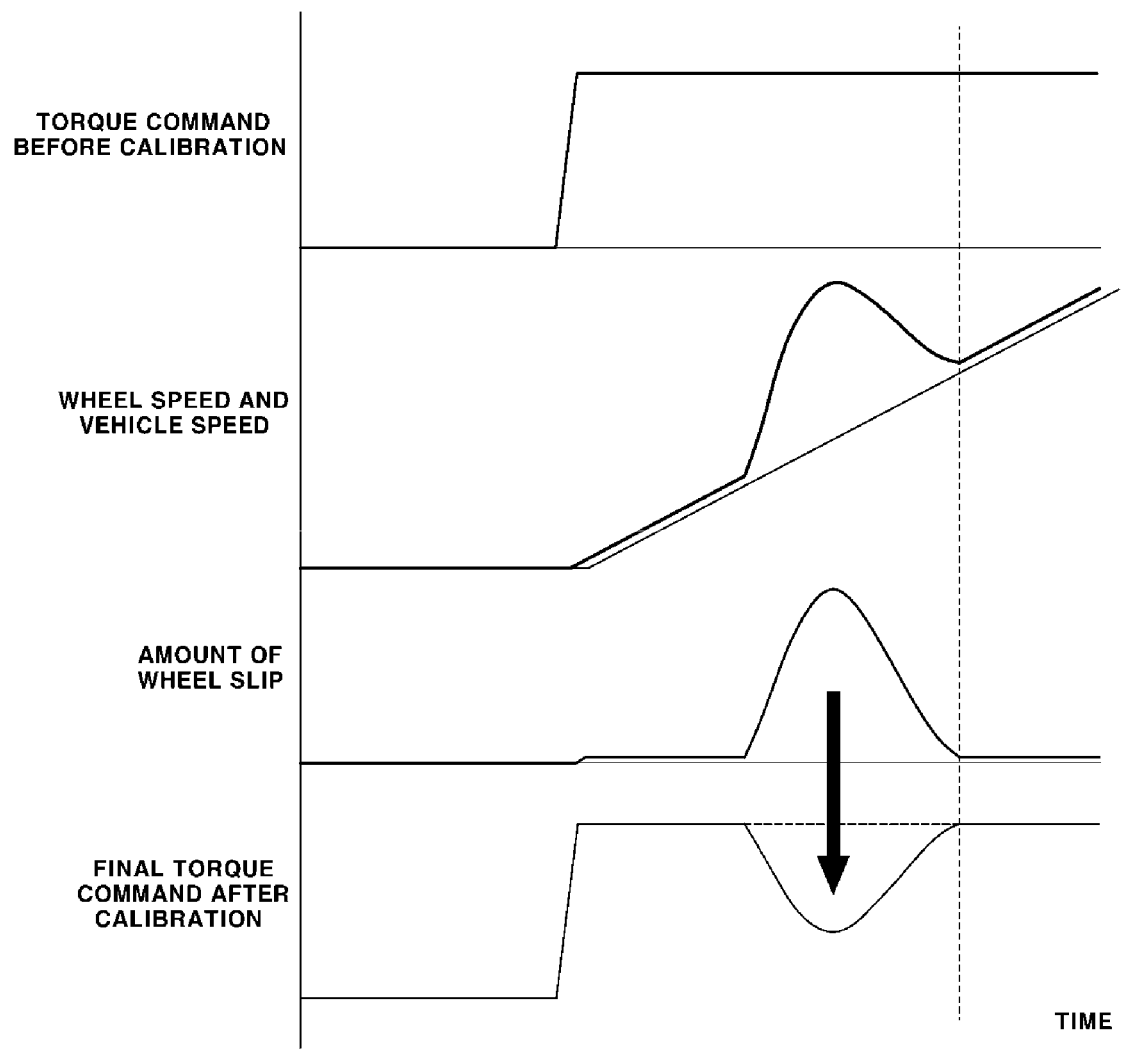
FIGS. 4 and 5 are diagrams showing the control states of a Comparative Example according to the related art and an exemplary embodiment according to the present disclosure separately.
Figure 5:
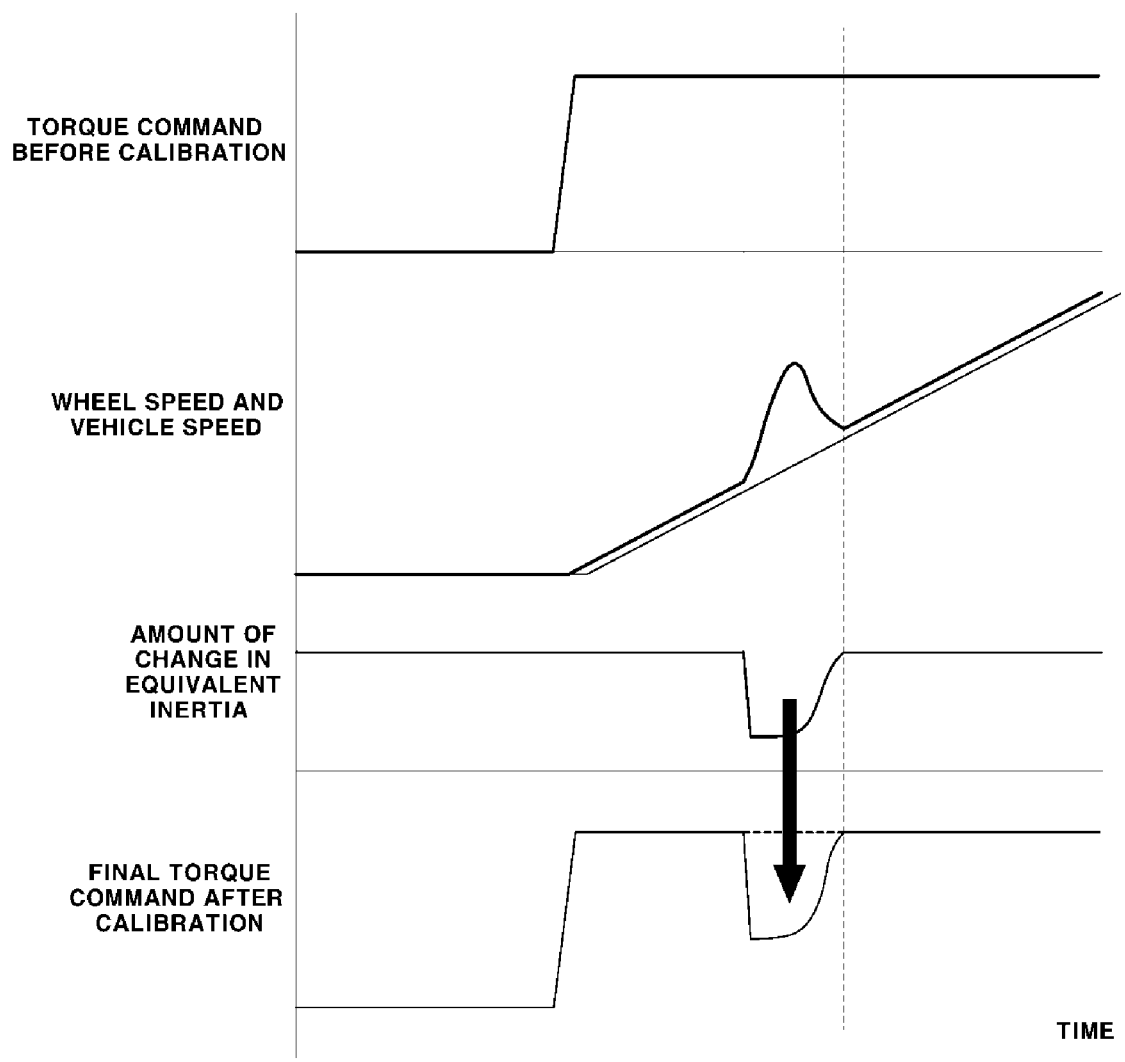

FIGS. 4 and 5 are diagrams showing the control states of a Comparative Example according to the related art and an exemplary embodiment according to the present disclosure separately. The Comparative Example of FIG. 4 is an example in which a conventional wheel speed difference based slip limit control is performed, and the example of FIG. 5 is an exemplary embodiment the present disclosure in which the equivalent inertia-based wheel slip limit control is performed.

In FIGS. 4 and 5, the top graph shows the driving torque (driving force) command before calibration, and in FIGS. 4 and 5, the second graph from the top shows a wheel speed and a vehicle speed of a driving wheel. Particularly, the vehicle speed may be a reference speed, which is a speed converted into a speed at a wheel (vehicle wheel).

In addition, in FIG. 4, the third graph from the top shows the amount of wheel slip of the driving wheel, and in FIG. 5, the third graph from the top shows an equivalent inertia. The bottom graphs in FIGS. 4 and 5 show the calibrated driving torque (driving force) commands. As shown in FIG. 4, in the Comparative Example, the driving torque command is calibrated based on the amount of wheel slip generated in the driving wheel. On the other hand, in the exemplary embodiment, as shown in FIG. 5, a control is performed to reduce the driving force by the amount corresponding to the amount of change in the equivalent inertia.

As described above, in the equivalent inertia-based wheel slip control method according to the present disclosure, unlike the conventional method limiting the wheel slip by comparing the actual vehicle speed (reference speed) with the vehicle wheel speed (wheel speed), a control may be performed to limit the amount of change in the equivalent inertia of the driving system obtained from the torque and the speed of the driving system. Accordingly, firstly, it may be possible to measure and use the speed closer to the driving source (driving device) than the vehicle wheel speed, thereby improving the control responsiveness, and limiting the amount of slip in advance before a significant slip is generated.

Secondly, it may also be possible to be effectively applied to a four-wheel drive (4WD) vehicle, unlike the conventional slip limiting control method that was difficult to apply to the four-wheel drive (4WD) vehicle, because the vehicle speed (reference speed) is not required. In addition, thirdly, processes such as the left and right wheel speed difference calibration, the tire rolling radius calibration, the heterogeneous tire sensing and calibration, and the front wheel and rear wheel difference calibration upon turning, which had to be performed to obtain the vehicle speed in the conventional control method, are not required since the vehicle speed (reference speed) is not required.

In addition, it is not necessary to set the threshold of the dead zone of the difference between the vehicle speed and the vehicle wheel speed for preventing unnecessary malfunction since the processes are not required, which may lead to improving additional control responsiveness. Fourthly, it is beneficial to the longitudinal slip rate control responsiveness, and also effective in securing the lateral stability since it is not necessary to perform the wheel speed calibration upon turning.

This effect is based on the fact that as the longitudinal slit rate may be suppressed by the tire friction source principle, the lateral force may be additionally secured upon turning, and provided is the effect that alleviates the phenomena of the understeer of the front wheel driving vehicle and the oversteer of the rear wheel driving vehicle.

As described above, although the exemplary embodiments of the present disclosure have been described in detail, the claims of the present disclosure are not limited to the above-described exemplary embodiments, and various modifications and improvements by those skilled in the art using the basic concept of the present disclosure defined in the appended claims may also be included in the claims of the present disclosure.

What is claimed is:

1. A method for controlling a wheel slip of a vehicle, comprising:
    estimating, by a controller, equivalent inertia information of a driving system based on operation information of the driving system while the vehicle is being driven;
    calculating, by the controller, the amount of calibration for calibrating a torque command of a driving device for driving the vehicle from the equivalent inertia information of the driving system estimated by the controller;
    calibrating, by the controller, the torque command of the driving device using the calculated amount of calibration; and
    adjusting, by the controller, the torque applied to a driving wheel according to the calibrated torque command.

2. The method for controlling the wheel slip of the vehicle of claim 1, wherein calculating the amount of calibration includes:
    calculating, by the controller, the amount of calibration by applying a calibration gain to the value of the estimated equivalent inertia information.

3. The method for controlling the wheel slip of the vehicle of claim 2, wherein the value of the estimated equivalent inertia information is the amount of change in the equivalent inertia, which is a difference between the equivalent inertia of the driving system obtained in real time and a basic equivalent inertia of a predetermined value.

4. The method for controlling the wheel slip of the vehicle of claim 1, further comprising:
    determining, by the controller, whether calibration is required by comparing the value of the estimated equivalent inertia information with a predetermined threshold,
    wherein calculating the amount of calibration when the calibration is required, calibrating the torque command of the driving device, and performing the control of the torque according to the calibrated torque command are performed.

5. The method for controlling the wheel slip of the vehicle of claim 4, wherein the value of the estimated equivalent inertia information is the amount of change in the equivalent inertia, which is a difference between the equivalent inertia of the driving system obtained in real time and a basic equivalent inertia of a predetermined value, and wherein the calibration is determined to be required when the amount of change in the equivalent inertia is greater than the predetermined threshold.

6. The method for controlling the wheel slip of the vehicle of claim 1, wherein calibrating the torque command of the driving device includes reducing, by the controller, the torque command of the driving device by the calculated amount of calibration.

7. The method for controlling the wheel slip of the vehicle of claim 1, wherein the equivalent inertia information of the driving system for calculating the amount of calibration is the amount of change in the equivalent inertia, which is a difference between the equivalent inertia of the driving system obtained in real time and a basic equivalent inertia of a predetermined value.

8. The method for controlling the wheel slip of the vehicle of claim 1, wherein the equivalent inertia information of the driving system for calculating the amount of calibration includes one of the following values: an equivalent inertia of the driving system itself, an inverse of the equivalent inertia of the driving system, an error value of the equivalent inertia of the driving system, and a squared value of the equivalent inertia of the driving system.

9. The method for controlling the wheel slip of the vehicle of claim 1, wherein the operation information of the driving system is a torque command of a previous control period for the driving device for operating the vehicle and speed information of the driving system detected by a speed detector.

10. The method for controlling the wheel slip of the vehicle of claim 9, wherein the equivalent inertia information of the driving system estimated by the controller includes the equivalent inertia of the driving system, and the equivalent inertia of the driving system is calculated by dividing the torque command of the previous control period by a speed of the driving system.

11. The method for controlling the wheel slip of the vehicle of claim 9, wherein the speed information of the driving system is at least one selected from the group consisting of: an engine speed, a motor speed, a rotational speed of a transmission input shaft, a rotational speed of a transmission output shaft, and a rotational speed of a starter generator connected to an engine.

12. The method for controlling the wheel slip of the vehicle of claim 1, wherein the vehicle is a motor-driven vehicle equipped with a motor as a driving device, and the torque command is a motor torque command.

* * * * *